(12) United States Patent
Buscemi et al.

(10) Patent No.: US 8,175,225 B2
(45) Date of Patent: May 8, 2012

(54) PREVENTING EMERGENCY COMMUNICATION SYSTEM NOTIFICATION CONGESTION

(75) Inventors: Willow Dawn Buscemi, Darien, CT (US); Patrick Joseph O'Sullivan, Dublin (IE); Edith Helen Stern, Yorktown Heights, NY (US); Robert Cameron Weir, Westford, MA (US); Barry E. Willner, Briarcliff Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 1366 days.

(21) Appl. No.: 11/761,349

(22) Filed: Jun. 11, 2007

(65) Prior Publication Data

US 2008/0304629 A1 Dec. 11, 2008

(51) Int. Cl.
 *H04M 11/04* (2006.01)
(52) U.S. Cl. ............................ 379/45; 379/37; 379/121.1
(58) Field of Classification Search ............... 379/37, 379/45, 112.1, 119, 221.03, 121.1; 370/229, 370/230, 237
See application file for complete search history.

(56) References Cited

U.S. PATENT DOCUMENTS

| 5,841,848 | A | 11/1998 | Dunn |
| 6,728,340 | B2 | 4/2004 | Vinson |
| 7,483,378 | B2 * | 1/2009 | Chikamatsu ............... 370/235.1 |
| 2002/0106059 | A1 * | 8/2002 | Kroll et al. ..................... 379/45 |
| 2004/0203575 | A1 * | 10/2004 | Chin et al. ................. 455/404.1 |

FOREIGN PATENT DOCUMENTS

EP 1111888 6/2001

OTHER PUBLICATIONS

"Wireless 911 Services"; [http://www.reverse-cellphone-lookup.com/articles/wireless_911_services.php], Dec. 29, 2011.

* cited by examiner

*Primary Examiner* — Curtis Kuntz
*Assistant Examiner* — Yosef K Laekemariam
(74) *Attorney, Agent, or Firm* — Lee Law, PLLC; Christopher B. Lee

(57) ABSTRACT

The invention discloses a method and system for preventing emergency communication system notification congestion by automatically identifying the telecommunications site transmitting an emergency call or through reporting of an address from which the call is made.

20 Claims, 1 Drawing Sheet

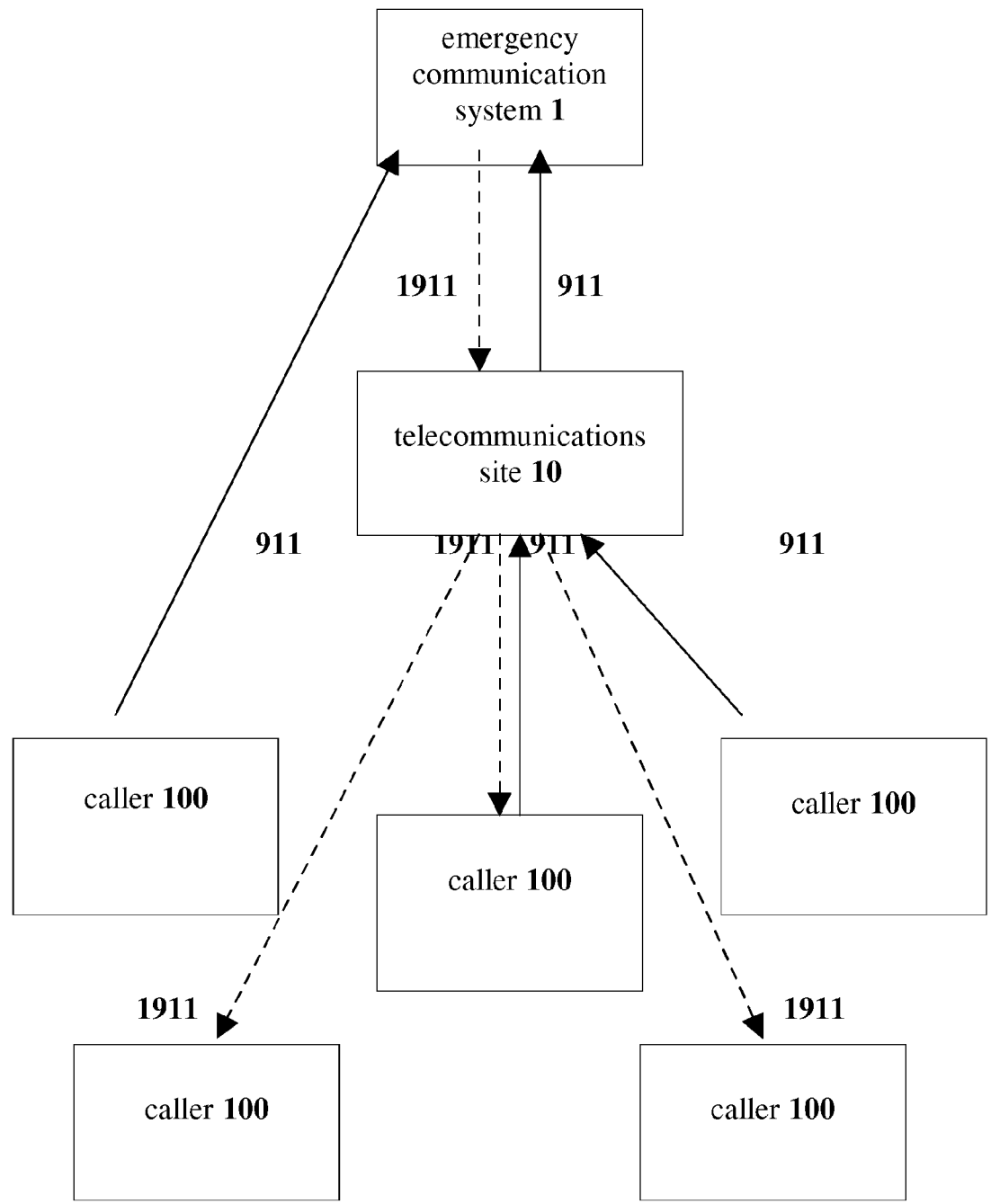

PREVENTING EMERGENCY COMMUNICATION SYSTEM NOTIFICATION CONGESTION

TECHNICAL FIELD

The invention relates to communication systems used in reporting of an emergency incident.

BACKGROUND

Notifications are often received from volunteers reporting an incident or situation requiring an emergency response; for example, when a traffic accident occurs on the highway in the United States or Canada, it is common for drivers witnessing the accident to call the nationally recognized "911" emergency telephone number to report it. However, lack of coordination can result in redundant notifications being received from multiple witnesses, leading to communication system congestion and possible confusion on the part of emergency response workers receiving the accident report(s). A recent news report in Toronto detailed an example where a three (3) minute wait time developed for the emergency "911" call center because of a traffic accident where twenty-six (26) witnesses placed cellular telephone calls to report the crash. The call center had thirteen (13) emergency operators on duty.

A caller normally dials "911" (or another accident reporting number) to report an emergency using current telecommunications technology/infrastructure and incident reporting procedures, whereupon the receiving operator determines whether the nature of the emergency is "public" or "private". Examples of "private emergencies" include a person having a heart attack or stroke (or other medical symptoms) that are not likely to be observed by multiple individuals. In such a case, the incident is handled using current emergency response procedures, with the receiving "911" call center dispatching the appropriate agenc(ies) and/or personnel (police, fire department, ambulance, etc.) to attend to the situation. Examples of "public emergencies" include a car accident on a highway or a fire, since these are likely to be seen (and reported) by multiple people. However, if all individuals capable of reporting the same "public emergency" dial "911", it will redundantly consume call center resources and may lead to failure of the emergency communication system due to congestion overload. Current emergency reporting regulations in the US require the ability to determine the location of the calling party when an emergency ("911") call is received. The location of the call is then associated with the emergency record created to report the problem. The invention uses this call location information to prevent emergency communication system notification congestion.

SUMMARY OF THE INVENTION

The invention provides a method and system for preventing communication system congestion in the reporting of an emergency incident by automatically identifying the location of the telecommunications site originating an emergency call and/or through reporting of an address from which the call is made, and providing a notification to subsequent caller(s) of previous report(s) of the incident to enable the caller to determine whether his or her call should be completed (or whether it would be a duplicate report of the same emergency incident).

In one embodiment of the invention, emergency call(s) received from a given locale are directed to an audio or text message recording selected details of incident(s) previously reported to have occurred within a defined distance from that location. In such cases, the emergency system can include a reporting call "threshold" before triggering notification of other callers. In another embodiment of the invention, an audio message reporting selected details of the emergency is broadcast to telecommunication devices in the geographic area of the incident.

It is therefore an object of the present invention to provide a method and system for preventing emergency communication system notification congestion by identifying the telecommunications site or address from which an emergency call is originated, in order to provide notification of previously reported incidents relevant to that site or address.

The subject matter which is regarded as the invention is particularly pointed out and distinctly claimed in the concluding portion of the specification. The invention, however, together with further objects and advantages thereof, may best be understood by reference to the following description taken in conjunction with the accompanying drawings.

BRIEF DESCRIPTION OF THE DETAILED DRAWINGS

FIG. 1 illustrates a diagram outlining operation of an emergency communication system according to the invention.

DETAILED DESCRIPTION OF THE PREFERRED EMBODIMENTS

FIG. 1 illustrates a diagram outlining an example of the operation(s) of a communication system 1 used in the reporting of an emergency incident. In one embodiment of the invention, an audio (or text) message 1911 reporting selected details of the emergency (i.e., "accident yyy at location xxx has already been reported") is broadcast to cellular telephones, "Blackberries"® or other telecommunication devices 100 in the geographic area of the incident. Devices which are to receive this notification can be determined by the tracking capabilities of local transmission facilit(ies) 10 (indicating which device telephone number(s) are sending/receiving signals to/from that transmitter) or by use of satellite navigation (GPS) systems accessible by the devices, etc. However, broadcasting this information to all communicating phones/devices within the area requires all users to be targeted instead of only those reporting an emergency, and it requires a user to read (or listen to) the message for it to be effective.

Thus in another (more preferred) embodiment of the invention, only "911" calls received from locations close to the (already-reported) emergency yyy are directed to an audio message 1911 providing these details. In that case, the relevant incident information is provided to a caller 100 by the emergency communication system 1 when a "911" call is placed from within the surrounding area near the incident. The extent of the incident surrounding area can be algorithmically determined or initially configured for the emergency system or determined by manual entry (per incident report). As an example, the incident surrounding area may be set to one (1) mile in an urban area, whereas it may be set to five (5) miles in a rural or highway area to allow for more rapid transit of vehicles. This feature avoids the need to broadcast the message to all individuals moving past the emergency scene (which can potentially disrupt driver concentration) and it does not preclude receiving other calls from the same geographic area that might pertain to a different problem. Note that it is desirable to allow emergency "911" calls to be connected in all cases (since a subsequent call to an emergency system may contain new or additional information). Upon delivering the message 1911 to a subsequent caller 100, the system 1 can allow the caller to make the determination as to whether to proceed with the call (with knowledge that the incident has already been reported).

The "911" operator receiving the initial report(s) can determine whether an emergency is "private" or "public". "Public" incidents are defined as those which are likely to be reported by multiple individuals (and are visible from public locations). Examples include car accidents, fires, and the like. Incidents that are not "public" are classified as "private". The system 1 determines the location of the emergency, which may be obtained from a user device 100 equipped with a GPS system or by identifying the radio/cellular telecommunications site 10 involved (or by analyzing signal strength from multiple locations, etc.). If the call is from a fixed (landline) telephone site 10 such as a public switched telephone network (PSTN) line or a cable-connected voice over internet protocol (VOIP) line, then the system 1 may receive the location from the telecommunications carrier through calling line identification or media access control (MAC) address identification. The location may also be identified through verbal or manual reporting of a street address from which the call is made and the system may itself identify the caller location (or may receive such information from the user device or from the communications carrier as described above). All of this information can be recorded automatically or through manual entry (such as by pinpointing the accident site on a map or using a computer "pull down" menu to select from a list of locations and/or emergency types). For example, the emergency operator can "click on" a computerized map (e.g., showing "the intersection of Route 9A and Pleasantville Road" as the accident site) and/or choose an accident description (i.e., "Jack Knifed—Tractor Trailer") from a "pull down" menu.

The emergency response system 1 can include a reporting call "threshold" (to provide empirical proof of a bonafide "public emergency") before triggering automatic notification of other potential callers (since notification of an already-reported duplicate call can be potentially confusing to callers). For example, if the notification threshold is set at "3" then three independent reports of the same emergency are required to allow verification of authenticity (and the collection of incident details) before automatic notification to callers in the geographic location of the emergency will take place (using the methods described herein). Such a threshold may be automatically (i.e., algorithmically) or manually set to any numerical value (including one or zero) to account for any type of disaster. When another caller reports the same emergency, details of the emergency will continue to be recorded until the threshold has been exceeded (whereupon new callers will receive an automated message indicating the reported problems in the area as described above). For example, a person calling from a location close to "the intersection of Route 9A and Pleasantville Road" will read or hear an automated message (such as "The jackknifed tractor trailer near Route 9A and Pleasantville Road has already been reported. Unless you have additional information about that accident or are calling about another problem you may hang up. To speak to a "911" operator press #1").

Audio or text messages may be generated automatically by the emergency reporting system 1 using excerpts of synthetic or recorded speech to form the message (in order to minimize the impact on "911" operators and on reporting callers) if the incident type and location is known. A preferred embodiment of the invention can use tracking of uniquely identified callers (such as through identification of individual calling telephone numbers) for determining if the automatic emergency notification threshold has been exceeded, since counting only the number of reporting callers from the same geographic area may prevent a caller from completing an incident report if a connection is lost and then reestablished. For example, if a caller dials "911" and (in mid-report) loses the telephone connection (through user error or loss of a cellular signal, etc.) then the feature requiring identification of unique callers will assure that such partial attempts do not trigger the informational 1911 message.

While certain preferred features of the invention have been shown by way of illustration, many modifications and changes can be made that fall within the true spirit of the invention as embodied in the following claims, which are to be interpreted as broadly as the law permits to cover the full scope of the invention, including all equivalents thereto.

What is claimed is:

1. An emergency response communication system configured to prevent congestion in reporting of an emergency at an emergency call center, where the emergency response communication system is configured to:
   receive, via a communication interface, a plurality of emergency call reports of an emergency incident from at least one caller communication device and a telecommunications site that is configured to transmit an emergency notification to caller devices from the emergency response communication system;
   determine a location of the reported emergency incident associated with the plurality of emergency call reports;
   verify authenticity of the reported emergency incident by tracking individual callers; and
   initiate, in response to verifying the authenticity of the reported emergency incident, automated transmission of the emergency notification to at least a second new caller device that calls from the determined location of the reported emergency incident associated with the plurality of emergency call reports.

2. The system of claim 1, where, in being configured to initiate, in response to verifying the authenticity of the reported emergency incident, the automated transmission of the emergency notification, the emergency response communication system is configured to record an audio or text message and transmit the audio or text message to provide the emergency notification.

3. The system of claim 1, where, in being configured to initiate, in response to verifying the authenticity of the reported emergency incident, the automated transmission of the emergency notification, the emergency response communication system is configured to generate a message using excerpts of synthetic or recorded speech.

4. The system of claim 1, where, in being configured to initiate, in response to verifying the authenticity of the reported emergency incident, the automated transmission of the emergency notification, the emergency response communication system is configured to initiate a recorded message providing notification of the reported emergency incident and broadcast the recorded message to one or more telecommunication devices within a defined distance from the determined location of the reported emergency incident.

5. The system of claim 1, where the emergency response communication system is further configured to initiate the automated transmission of the emergency notification in response to one or more emergency call reports received from locations within a defined distance from the determined location of the reported emergency incident, where caller devices associated with the one or more emergency call reports received from the locations within the defined distance receive a recorded message providing the emergency notification.

6. The system of claim 1, where, in being configured to verify the authenticity of the reported emergency incident by tracking the individual callers, the emergency response communication system is configured to determine whether a reporting call notification threshold is reached before triggering the automated transmission of the emergency notification.

7. The system of claim 6, where, in being configured to verify the authenticity of the reported emergency incident by tracking the individual callers, the emergency response communication system is configured to track the individual callers to determine if the reporting call notification threshold has been exceeded.

8. The system of claim 6, where the emergency response communication system is further configured to record the plurality of emergency call reports until the reporting call notification threshold is exceeded.

9. The system of claim 6, where the emergency response communication system is further configured to determine the reporting call notification threshold automatically.

10. The system of claim 1, where the plurality of emergency call reports report public emergencies.

11. A method of using an emergency response communication system to prevent congestion in reporting of an emergency at an emergency call center, comprising:
receiving, via a communication interface, a plurality of emergency call reports of an emergency incident from at least one caller communication device and a telecommunications site that is configured to transmit an emergency notification to caller devices from the emergency response communication system;
determining a location of the reported emergency incident associated with the plurality of emergency call reports;
verifying authenticity of the reported emergency incident by tracking individual callers; and
initiating, in response to verifying the authenticity of the reported emergency incident, automated transmission of the emergency notification to at least a second new caller device that calls from the determined location of the reported emergency incident associated with the plurality of emergency call reports.

12. The method of claim 11, where initiating, in response to verifying the authenticity of the reported emergency incident, the automated transmission of the emergency notification comprises recording an audio or text message and transmitting the audio or text message to provide the emergency notification.

13. The method of claim 11, where initiating, in response to verifying the authenticity of the reported emergency incident, the automated transmission of the emergency notification comprises generating a message using excerpts of synthetic or recorded speech.

14. The method of claim 11, where initiating, in response to verifying the authenticity of the reported emergency incident, the automated transmission of the emergency notification comprises initiating a recorded message providing notification of the reported emergency incident and broadcasting the recorded message to one or more telecommunication devices within a defined distance from the determined location of the reported emergency incident.

15. The method of claim 11, further comprising initiating the automated transmission of the emergency notification in response to one or more emergency call reports received from locations within a defined distance from the determined location of the reported emergency incident, where caller devices associated with the one or more emergency call reports received from the locations within the defined distance receive a recorded message providing the emergency notification.

16. The method of claim 11, where verifying the authenticity of the reported emergency incident by tracking the individual callers comprises determining whether a reporting call notification threshold is reached before triggering the automated transmission of the emergency notification.

17. The method of claim 16, where verifying the authenticity of the reported emergency incident by tracking the individual callers comprises tracking the individual callers to determine if the reporting call notification threshold has been exceeded.

18. The method of claim 16, further comprising recording the plurality of emergency call reports until the reporting call notification threshold is exceeded.

19. The method of claim 16, further comprising determining the reporting call notification threshold automatically.

20. The method of claim 11, where the plurality of emergency call reports report public emergencies.

* * * * *